US010649494B2

(12) United States Patent
Li

(10) Patent No.: US 10,649,494 B2
(45) Date of Patent: May 12, 2020

(54) SCREEN CONTENT SWITCHING METHOD AND DOUBLE-SCREEN MOBILE TERMINAL

(71) Applicant: ZTE CORPORATION, Shenzhen, Guangdong Province (CN)

(72) Inventor: Zhao Li, Shenzhen (CN)

(73) Assignee: ZTE CORPORATION (CN)

( * ) Notice: Subject to any disclaimer, the term of this patent is extended or adjusted under 35 U.S.C. 154(b) by 41 days.

(21) Appl. No.: 15/554,864

(22) PCT Filed: May 19, 2017

(86) PCT No.: PCT/CN2017/085200
§ 371 (c)(1),
(2) Date: Aug. 31, 2017

(87) PCT Pub. No.: WO2018/126591
PCT Pub. Date: Jul. 12, 2018

(65) Prior Publication Data
US 2018/0267573 A1 Sep. 20, 2018

(30) Foreign Application Priority Data
Jan. 3, 2017 (CN) .......................... 2017 1 0001854

(51) Int. Cl.
G06F 1/16 (2006.01)
G06F 3/0488 (2013.01)

(52) U.S. Cl.
CPC .......... *G06F 1/1647* (2013.01); *G06F 1/1641* (2013.01); *G06F 3/04886* (2013.01); *G06F 2200/1614* (2013.01)

(58) Field of Classification Search
None
See application file for complete search history.

(56) References Cited

U.S. PATENT DOCUMENTS 9,785,278 B2 * 10/2017 Yoshida ................. G06F 3/044
9,958,767 B1 * 5/2018 Reichow ................. G06T 13/40
(Continued)

FOREIGN PATENT DOCUMENTS

CN 102841723 * 12/2012
CN 102841723 A 12/2012
(Continued)

OTHER PUBLICATIONS

International Search Report dated Oct. 11, 2017; International Patent Application No. PCT/CN2017/085200.
(Continued)

Primary Examiner — Andre L Matthews
(74) Attorney, Agent, or Firm — McDonald Hopkins LLC

(57) ABSTRACT

The present document discloses a screen content switching method and a double-screen mobile terminal. The method includes: detecting a handheld state of a double-screen mobile terminal when a target application interface is displayed on a target screen, herein the target screen is one screen of the double-screen mobile terminal; judging whether the handheld state corresponds to the target screen; and if the handheld state does not correspond to the target screen, switching the target application interface to be displayed on the other screen of the double-screen mobile terminal. When the screen on which the application interface is displayed does not correspond to the handheld state, the double-screen mobile terminal can automatically switch the application interface to be displayed on the screen corresponding to the handheld state.

2 Claims, 8 Drawing Sheets

(56) References Cited

U.S. PATENT DOCUMENTS

| | | | |
|---|---|---|---|
| 10,409,395 B2* | 9/2019 | Li | G06K 9/00006 |
| 2005/0140574 A1* | 6/2005 | Tamura | G06F 1/1616 |
| | | | 345/9 |
| 2013/0009903 A1 | 1/2013 | Shiota | |
| 2015/0317120 A1 | 11/2015 | Kim et al. | |
| 2016/0378344 A1* | 12/2016 | Nachimuthu | G06F 9/4403 |
| | | | 711/103 |
| 2017/0038934 A1* | 2/2017 | Sirpal | G06F 1/1616 |

FOREIGN PATENT DOCUMENTS

| | | |
|---|---|---|
| CN | 103218109 A | 7/2013 |
| CN | 104423794 A | 3/2015 |
| WO | 2011135944 A1 | 7/2013 |
| WO | 2013145491 A1 | 12/2015 |
| WO | 2013175798 A1 | 1/2016 |

OTHER PUBLICATIONS

European Search Report dated May 20, 2019; European Application No. 17755046.6.
Translation of Office Action dated Feb. 12, 2019; Japanese Patent Application No. 2017-545754.

* cited by examiner

SCREEN CONTENT SWITCHING METHOD AND DOUBLE-SCREEN MOBILE TERMINAL

TECHNICAL FIELD

The present disclosure relates to but is not limited to the technical field of communication, in particular to a screen content switching method and a double-screen mobile terminal.

BACKGROUND

A double-screen mobile terminal has a first screen and a second screen, and there may be three modes between the first screen and the second screen, i.e., a single screen mode, a double screen mode and a mirror mode. When the first screen and the second screen are simultaneously unfolded, the screen of the double-screen mobile terminal will be larger. When a user performs an operation with a single hand, it is very difficult to touch application interfaces on two screens. For example, when the double-screen mobile terminal is in a portrait display state, if a user uses a right hand to operate on the double-screen mobile terminal, it is very difficult to touch an application interface which is displayed on the left screen and it is very inconvenient. As a result, at present, there is a problem that it is inconvenient to operate an application on the double-screen mobile terminal.

SUMMARY

What is described below is a summary of the subject described in detail in this document. The summary is not used for limiting the protection scope of the claims.

Embodiments of the present disclosure provide a screen content switching method and a double-screen mobile terminal, which solve the problem that it is inconvenient to operate an application on the double-screen mobile terminal in the existing art.

An embodiment of the present disclosure provides a screen content switching method, applied to a double-screen mobile terminal, including: detecting a handheld state of the double-screen mobile terminal when a target application interface is displayed on a target screen, herein the target screen is one screen of the double-screen mobile terminal;

judging whether the handheld state corresponds to the target screen; and if the handheld state does not correspond to the target screen, switching the target application interface to be displayed on other screen of the double-screen mobile terminal.

An embodiment of the present disclosure further provides a double-screen mobile terminal, including a first detection module, a first judgment module and a first switching module.

The first detection module is configured to detect a handheld state of the double-screen mobile terminal when a target application interface is displayed on a target screen; herein the target screen is one screen of the double-screen mobile terminal.

The first judgment module is configured to judge whether the handheld state corresponds to the target screen.

The first switching module is configured to, if the handheld state does not correspond to the target screen, switch the target application interface to be displayed on other screen of the double-screen mobile terminal.

An embodiment of the present disclosure further provides a machine-readable medium, storing one or more computer-executable programs. When executed by a computer, the one or more computer-executable programs enable the computer to execute the above-mentioned screen content switching method.

One technical solution of the above-mentioned technical solutions has the following advantages or beneficial effects.

According to the embodiments of the present disclosure, a handheld state of the double-screen mobile terminal is detected when a target application interface is displayed on a target screen, herein the target screen is one screen of the double-screen mobile terminal; whether the handheld state corresponds to the target screen is judged; and if the handheld state does not correspond to the target screen, the target application interface is switched to be displayed on the other screen of the double-screen mobile terminal. When the screen on which the application interface is displayed does not correspond to the handheld state, the double-screen mobile terminal can automatically switch the application interface to be displayed on the screen corresponding to the handheld state, and thereby it is more convenient to operate an application.

After the drawings and the detailed description are read and understood, other aspects can be understood.

DETAILED DESCRIPTION

Description will be made below in detail with reference to the drawings in combination with embodiments.

Figure 1:
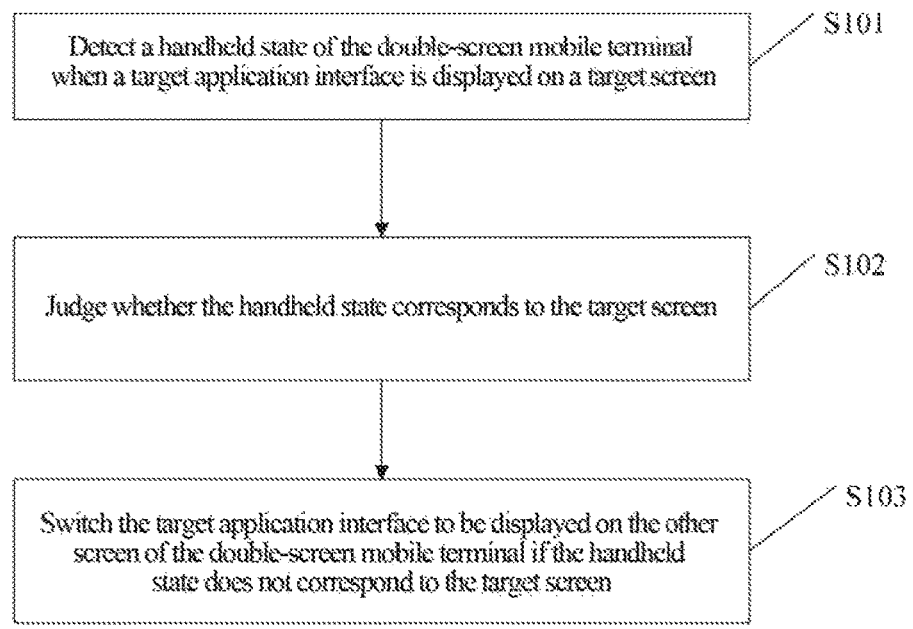
FIG. 1 illustrates a flowchart of a screen content switching method according to an embodiment of the present disclosure.

As illustrated in FIG. 1, an embodiment of the present disclosure provides a screen content switching method, applied to a double-screen mobile terminal, including the following steps S101-S103.

In step S101, a handheld state of the double-screen mobile terminal is detected when a target application interface is displayed on a target screen, herein the target screen is one screen of the double-screen mobile terminal.

In step S102, whether the handheld state corresponds to the target screen is judged.

In step S103, if the handheld state does not correspond to the target screen, the target application interface is switched to be displayed on the other screen of the double-screen mobile terminal.

In the step S101, firstly, a user unfolds screens of the double-screen mobile terminal, and the user may select a display state of the double-screen mobile terminal, and may enable the double-screen mobile terminal to be in a landscape display state, and may also enable the double-screen mobile terminal to be in a portrait display state.

When the double-screen mobile terminal is in a portrait display state, the two screens are horizontally arranged and are respectively a left screen and a right screen, and the user may perform an operation on any one screen of the two screens. Supposed that the user performs an operation on the right screen at this moment, e.g., performs an operation of modifying a layout of multiple application icons on the right screen. If the user wants to open an application at this moment and clicks an icon of this application, the double-screen mobile terminal will acquire an operation frequency level of this application and compare the operation frequency level of this application with a preset target level. When the operation frequency level of this application is higher than the preset target level, the application interface of this application may be displayed on the screen on which the user performed the operation previously, i.e., displayed on the right screen. When the operation frequency level of this application is lower than or equal to the preset target level, the application interface of this application may be displayed on the screen instead of the screen on which the user performed the operation previously, i.e., displayed on the left screen.

The operation frequency level of each application may be preset, and may also be determined by the double-screen mobile terminal according to start times of each application. For example, use frequency of a kind of applications, such as social software, is relatively high, and thus the operation frequency levels of the kind of applications, such as social software, may be set to be higher. Use frequency of a kind of applications, such as calendar, is lower, and thus the operation frequency levels of the kind of the applications, such as calendar, may be set to be lower. Or, the double-screen mobile terminal may record start times of each application, and the double-screen mobile terminal may set the operation frequency levels of applications which are started more times to be higher and set the operation frequency levels of applications which are started fewer times to be lower.

Supposed that the user clicks the icon of the calendar application at this moment, and then the double-screen mobile terminal will acquire the operation frequency level of the calendar application, compare the operation frequency level of the calendar application with the preset target level. The double-screen mobile terminal judges that the operation frequency level of the calendar application is lower than the preset target level, and then the double-screen mobile terminal will display the application interface of the calendar application on the screen instead of the screen on which the user performs the operation previously, i.e., displayed on the left screen. Then, the double-screen mobile terminal will detect the handheld state and judge whether the handheld state is a single-hand handheld state or a double-hand handheld state.

In the step S102, the double-screen mobile terminal may detect pressed positions on a back side and judge whether the detected pressed positions are distributed on the same screen. If the detected pressed positions are distributed on the same screen, it indicates that the current handheld state is the single-hand handheld state. If the detected pressed positions are not distributed on the same screen but are districted on two screens, it indicates that the current handheld state is the double-hand handheld state.

Supposed that the double-screen mobile terminal judges that all pressed positions are distributed on the right screen at this moment, it indicates that the current handheld state is the single-hand handheld state and is a right-hand handheld state, i.e., the user is holding the right screen with the right hand. However, the calendar application interface is being displayed on the left screen, thus the double-screen mobile terminal will judge that the screen on which the application interface is displayed does not correspond to the handheld state.

Figure 2:
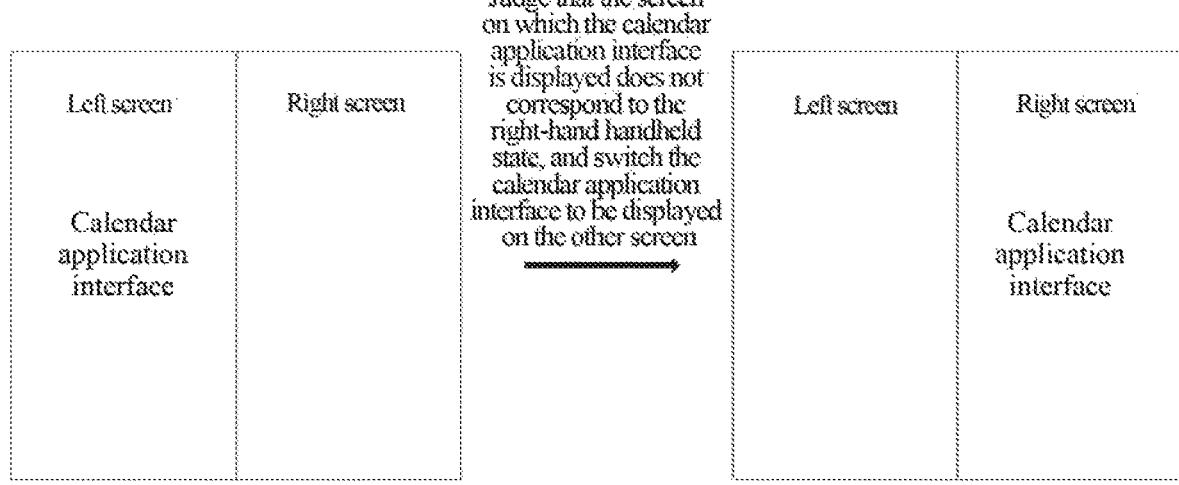
FIG. 2 illustrates a schematic diagram of switching a calendar application interface to be displayed on a right screen according to an embodiment of the present disclosure.

In the step S103, the double-screen mobile terminal judges that the screen on which the application interface is displayed does not correspond to the handheld state, i.e., the double-screen mobile terminal judges that the left screen on which the calendar application interface is displayed does not correspond to the right-hand handheld state, the double-screen mobile terminal will switch the calendar application interface to be displayed on the other screen, i.e., switch the calendar application interface to be displayed on the right screen. Thereby, the user can more conveniently and rapidly operate the calendar application on the right screen with the right hand. As illustrated in FIG. 2, it illustrates a schematic diagram of switching the calendar application interface to be displayed on the right screen.

This embodiment provides a screen content switching method applied to a double-screen mobile terminal. When a screen on which an application interface is displayed does not correspond to a handheld state, the double-screen mobile terminal can automatically switch the application interface to be displayed on a screen corresponding to the handheld state, and thereby it is more convenient to operate an application.

Figure 3:
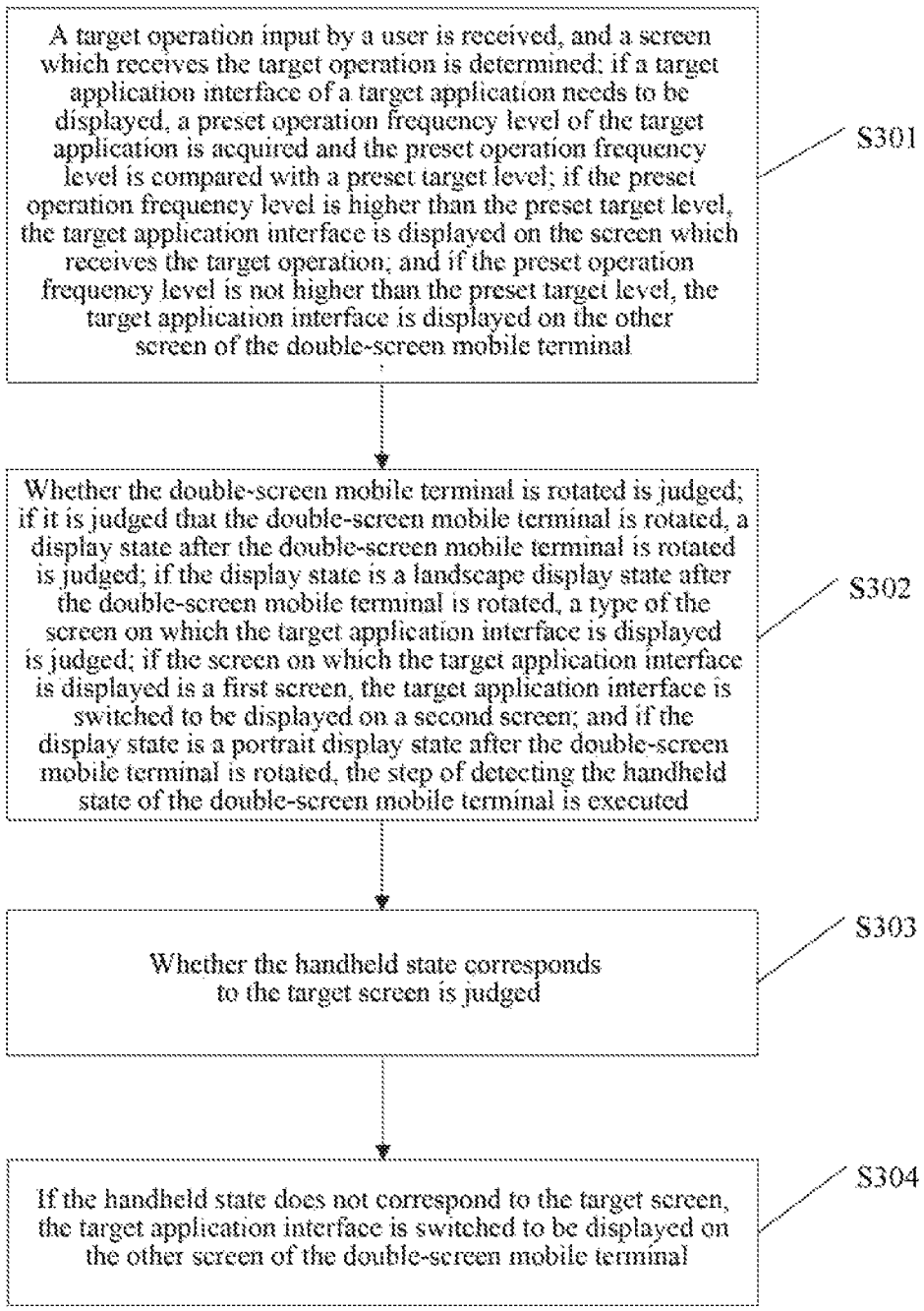
FIG. 3 illustrates a flowchart of another screen content switching method according to an embodiment of the present disclosure.

As illustrated in FIG. 3, an embodiment of the present disclosure provides another screen content switching method applied to a double-screen mobile terminal, including the following steps S301-S304.

In step S301, a target operation input by a user is received and a screen which receives the target operation is determined. If a target application interface of a target application needs to be displayed, a preset operation frequency level of the target application is acquired, and the preset operation frequency level is compared with a preset target level. If the preset operation frequency level is higher than the preset target level, the target application interface is displayed on the screen which receives the target operation. If the preset operation frequency level is not higher than the preset target level, the target application interface is displayed on the other screen of the double-screen mobile terminal.

In the step S301, when the double-screen mobile terminal is in a portrait display state, the two screens are horizontally arranged and are respectively a left screen and a right screen, and the user may perform an operation on any one screen of the two screens. Supposed that the user performs an operation on the left screen at this moment, e.g., performs an operation of modifying a layout of multiple application icons on the left screen. If the user wants to open an application at this moment and clicks an icon of this application, the double-screen mobile terminal will acquire an operation frequency level of this application and compare the operation frequency level of this application with a preset target level. When the operation frequency level of this application is higher than the preset target level, the application interface of this application may be displayed on the screen on which the user performed the operation previously, i.e., displayed on the left screen. When the operation frequency level of this application is lower than or equal to the preset target level, the application interface of this application may be displayed on the screen instead of the screen on which the user performed the operation previously, i.e., displayed on the right screen.

Supposed that the user clicks an icon of a game application at this moment, and then the double-screen mobile terminal will acquire the operation frequency level of the game application, and compare the operation frequency level of the game application with the preset target level. The double-screen mobile terminal judges that the operation frequency level of the game application is higher than the preset target level, and thus the double-screen mobile terminal will display the application interface of the game application on the screen on which the user performed the operation previously, i.e., displayed on the left screen. After the game application is opened, if the user also wants to open the browser application and clicks an icon of the browser application, then the application interface of the browser application will be displayed on the other screen.

In one exemplary implementation mode, the preset operation frequency level may be a preset operation frequency level obtained through presetting; or the preset operation frequency level may be a preset operation frequency level determined by the double-screen mobile terminal according to start times of the target application.

The operation frequency level of each application may be preset, and may also be determined by the double-screen mobile terminal according to start times of each application. For example, use frequency of a kind of applications, such as social software, is relatively high, thus the operation frequency levels of the kind of applications, such as social software, may be set to be higher. Use frequency of a kind of applications, such as calendar, is lower, thus the operation frequency levels of the kind of the applications, such as calendar, may be set to be lower. Or, the double-screen mobile terminal may record start times of each application, and the double-screen mobile terminal may set the operation frequency levels of applications which are started more times to be higher and set the operation frequency levels of applications which are started fewer times to be lower.

In step S302, whether the double-screen mobile terminal is rotated is judged. If it is judged that the double-screen mobile terminal is rotated, a display state after the double-screen mobile terminal is rotated is judged. If the display state is a landscape display state after the double-screen mobile terminal is rotated, a type of the screen on which the target application interface is displayed is judged. If the screen on which the target application interface is displayed is a first screen, the target application interface is switched to be displayed on a second screen. If the display state is a portrait display state after the double-screen mobile terminal is rotated, the step of detecting the handheld state of the double-screen mobile terminal is executed.

In the step S302, supposed that the current display state is a portrait display state, the user has already opened a first instant messaging application and the application interface of the first instant messaging application is displayed on the left screen. If the user clockwise rotates the double-screen mobile terminal for 90°, i.e., rotates the double-screen mobile terminal to be in a landscape display state, under a normal situation, the application interface of the first instant messaging application should be displayed on the upper screen.

When the double-screen mobile terminal is in a landscape display state, no matter that the user performs an operation with a single hand or double hands, the user is used to performing an operation on the lower screen. Thus it may be preset that, when the double-screen mobile terminal is rotated to be in a landscape display state, if only one application is opened, the application interface of this opened application is displayed on the lower screen, and if two applications are opened, the application interface of the application with the higher operation frequency level is displayed on the lower screen and the application interface of the application with the lower operation frequency level is displayed on the upper screen.

Figure 4:
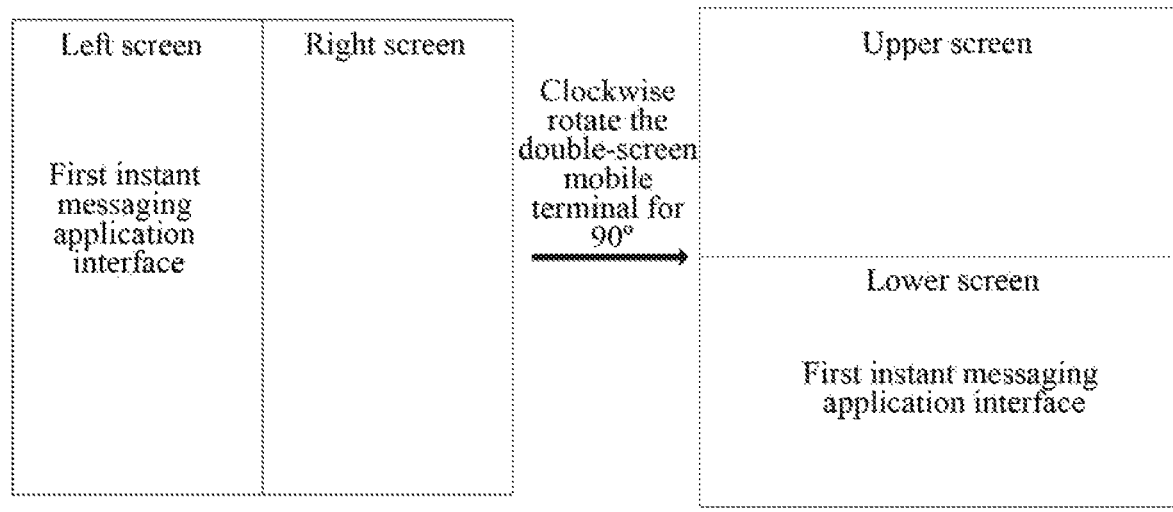
FIG. 4 illustrates a schematic diagram of displaying an application interface when a double-screen mobile terminal is rotated to be in a landscape display state according to an embodiment of the present disclosure.

Therefore, when the user rotates the double-screen mobile terminal to be in a landscape display state, the double-screen mobile terminal will display the application interface of the first instant messaging application on the lower screen. As illustrated in FIG. 4, it illustrates a schematic diagram of displaying an application interface when a double-screen mobile terminal is rotated to be in a landscape display state.

Supposed that the current display state is a portrait display state and the user opens two applications. Herein, one application is the first instant messaging application and the other application is a video player application. The operation frequency level of the first instant messaging application is higher than the operation frequency level of the video player application, and the application interface of the first instant messaging application is displayed on the left screen and the application interface of the video player application is displayed on the right screen. If at this moment the user clockwise rotates the double-screen mobile terminal for 90°, i.e., rotates the double-screen mobile terminal to be in a landscape display state, under a normal situation, the application interface of the first instant messaging application should be displayed on the upper screen and the application interface of the video player application should be displayed on the lower screen.

Figure 5:
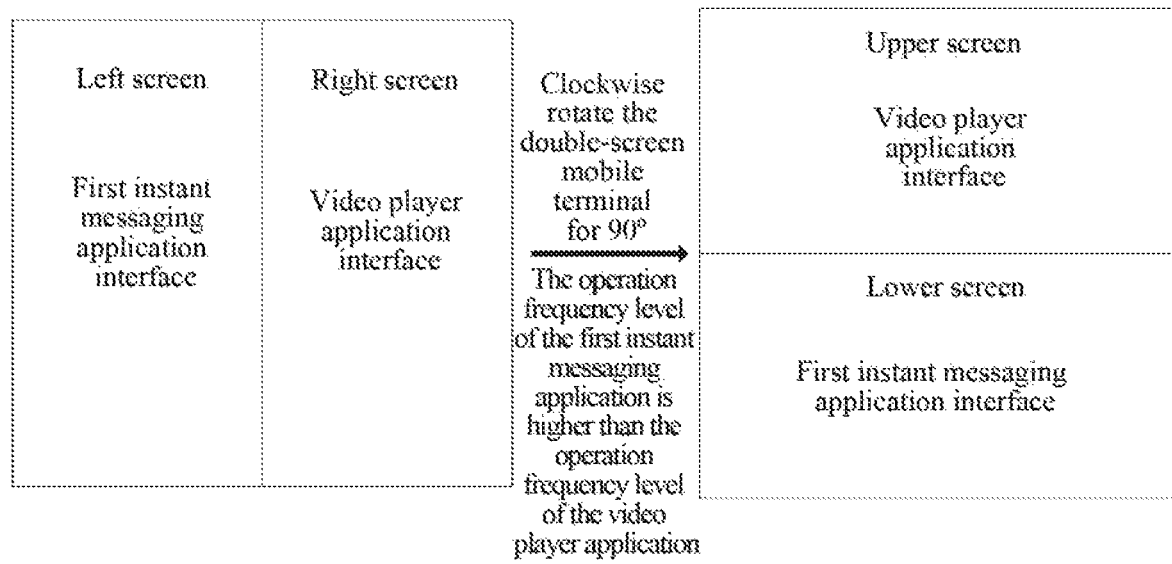
FIG. 5 illustrates another schematic diagram of displaying an application interface when a double-screen mobile terminal is rotated to be in a landscape display state according to an embodiment of the present disclosure.

At this moment, the double-screen mobile terminal will compare the operation frequency level of the first instant messaging application with the operation frequency level of the video player application. The double-screen mobile terminal judges that the operation frequency level of the first instant messaging application is higher than the operation frequency level of the video player application, thus the application interface of the first instant messaging application will be displayed on the lower screen and the application interface of the video player application will be displayed on the upper screen. As illustrated in FIG. 5, it illustrates another schematic diagram of displaying an application interface when a double-screen mobile terminal is rotated to be in a landscape display state.

It needs to be stated that, when the double-screen mobile terminal is in a portrait display state, if the operation frequency levels of the two opened applications are the same, when the double-screen mobile terminal is rotated to be in a landscape display state, the display states of the application interfaces of the two applications are decided according to the operation state of the user before the rotation.

Figure 6:
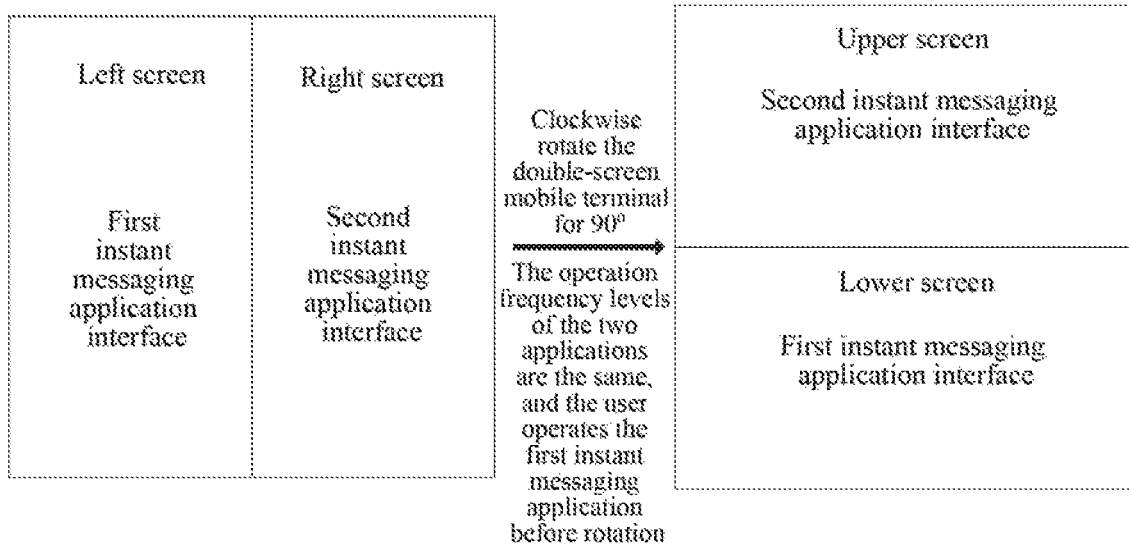
FIG. 6 illustrates another schematic diagram of displaying an application interface when a double-screen mobile terminal is rotated to be in a landscape display state according to an embodiment of the present disclosure.

For example, when the double-screen mobile terminal is in a portrait display state, two applications are opened, and one application is the first instant messaging application, and the other application is a second instant messaging application. The operation frequency levels of the two applications are the same, and the application interface of the first instant messaging application is displayed on the left screen, and the application interface of the second instant messaging application is displayed on the right screen. If the user clockwise rotates the double-screen mobile terminal for 90° at this moment, i.e., rotates the double-screen mobile terminal to be in a landscape display state, the double-screen mobile terminal will compare the operation frequency level of the first instant messaging application with the operation frequency level of the second instant messaging application. The double-screen mobile terminal judges that the operation frequency level of the first instant messaging application is equal to the operation frequency level of the second instant messaging application, and at this moment the double-screen mobile terminal will further judge which application is operated by the user before rotation. Supposed that the user operates the first instant messaging application before rotation, then the application interface of the first instant messaging application will be displayed on the lower screen after rotation, and the application interface of the second instant messaging application will be displayed on the upper screen. The purpose of that is to consider that the user is operating the first instant messaging application before rotation, and the user possibly also wants to operate the first instant messaging application after rotation and thus the application interface of the first instant messaging application is displayed on the lower screen to facilitate the user to perform an operation. As illustrated in FIG. 6, it illustrates another schematic diagram of displaying an application interface when a double-screen mobile terminal is rotated to be in a landscape display state.

When the double-screen mobile terminal is rotated to be in a portrait display state, the handheld state of the double-screen mobile terminal further needs to be detected.

It needs to be stated that the double-screen mobile terminal may use a direction sensor to detect a rotation state, and may also use other means to detect the rotation state, and the implementation mode is not limited as long as the purpose of detecting the rotation state can be achieved.

In one exemplary implementation mode, the step of detecting the handheld state of the double-screen mobile terminal may include that:

pressed positions on a back side of the double-screen mobile terminal are detected;

if the pressed positions are distributed on the same screen, it is determined that the handheld state is a single-hand handheld state; and if the pressed positions are distributed on two screens, it is determined that the handheld state is a double-hand handheld state.

The step of judging whether the handheld state corresponds to the target screen, and if the handheld state does not correspond to the target screen, switching the target application interface to be displayed on the other screen of the double-screen mobile terminal may include the following operations.

If the handheld state is the single-hand handheld state, whether the screen on which the target application interface is displayed corresponds to the single-hand handheld state is judged.

If the screen on which the target application interface is displayed does not correspond to the single-hand handheld state, the target application interface is switched to be displayed on a screen corresponding to the single-hand handheld state.

If the handheld state is the double-hand handheld state, whether the screen on which the target application interface is displayed corresponds to the double-hand handheld state is judged.

If the screen on which the target application interface is displayed does not correspond to the double-hand handheld state, the target application interface is switched to be displayed on the screen corresponding to the double-hand handheld state.

When the double-screen mobile terminal is rotated to be in a portrait display state, the double-screen mobile terminal further needs to detect the handheld state. The double-screen mobile terminal may detect pressed positions on a back side and judge whether the detected pressed positions are distributed on the same screen. If the detected pressed positions are distributed on the same screen, it indicates that the current handheld state is the single-hand handheld state. If the detected pressed positions are not distributed on the same screen but are districted on two screens, it indicates that the current handheld state is the double-hand handheld state. The double-screen mobile terminal may use a pressure sensor to detect the pressed positions, and may also use other means to detect the pressed positions. The implementation mode is not limited as long as the purpose of detecting the pressed positions can be achieved.

Supposed that the current display state of the double-screen mobile terminal is a landscape display state, the second instant messaging application has already been opened, and the application interface of the second instant messaging application is displayed on the lower screen. If at this moment the user anticlockwise rotates the double-screen mobile terminal for 90°, i.e., rotates the double-screen mobile terminal to be in a portrait display state, the application interface of the second instant messaging application is displayed on the right screen, and at this moment the double-screen mobile terminal will detect the handheld state.

Figure 7:
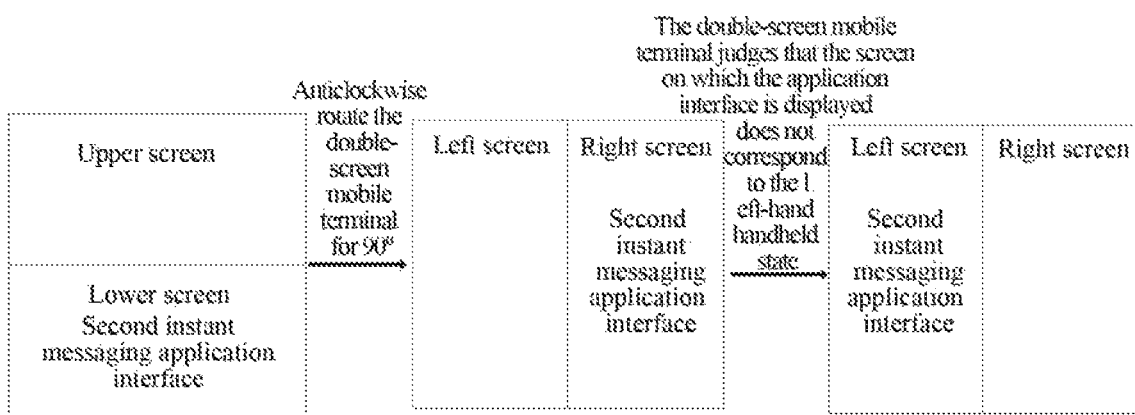
FIG. 7 illustrates a schematic diagram of displaying an application interface when a double-screen mobile terminal is rotated to be in a portrait display state according to an embodiment of the present disclosure.

The double-screen mobile terminal may detect pressed positions on a back side and judge whether the detected pressed positions are distributed on the same screen. If the detected pressed positions are all distributed on the left screen, it indicates that the current handheld state is the single-hand handheld state and is a left-hand handheld state, i.e., at this moment the user is holding the left screen with a left hand. Since the application interface of the second instant messaging application is displayed on the right screen, the double-screen mobile terminal will judge that the screen on which the application interface is displayed does not correspond to the handheld state, and thus the application interface of the second instant messaging application will be switched to be displayed on a screen corresponding to the current handheld state, i.e., is switched to be displayed on the left screen. As illustrated in FIG. 7, it illustrates a schematic diagram of displaying an application interface when a double-screen mobile terminal is rotated to be in a portrait display state.

If the detected pressed positions are all distributed on the right screen, it indicates that the current handheld state is the single-hand handheld state and is a right-hand handheld state, i.e., at this moment the user is holding the right screen with a right hand. Since at this moment the application interface of the second instant messaging application is displayed on the right screen, the double-screen mobile terminal does not need to switch the application interface any longer.

If the detected pressed positions are distributed on two screens, it indicates that the current handheld state is the double-hand handheld state. And the double-screen mobile terminal will further judge which hand of the user holds the double-screen mobile terminal. If it is judged that the right hand of the user holds the double-screen mobile terminal, it indicates that at this moment the user needs to operate the application with a left hand, thus the double-screen mobile terminal will switch the application interface of the second instant messaging application to be displayed on the left screen. The purpose of that is to consider that the user needs to operate the application with the left hand and thus the application interface of the application is displayed on the left screen to facilitate the user to perform an operation. If it is judged that the left hand of the user holds the double-screen mobile terminal, it indicates that at this moment the user needs to operate the application with the right hand. Since at this moment the application interface of the second instant messaging application is displayed on the right screen, the double-screen mobile terminal does not need to switch the application interface.

Supposed that the current display state of the double-screen mobile terminal is a landscape display state and the user opens two applications. Herein, one application is the first instant messaging application, and the other application is the video player application. The operation frequency level of the first instant messaging application is higher than the operation frequency level of the video player application, and the application interface of the first instant messaging application is displayed on the lower screen and the application interface of the video player application is displayed on the upper screen. If at this moment the user clockwise rotates the double-screen mobile terminal for 90°, i.e., rotates the double-screen mobile terminal to be in a portrait display state, the application interface of the first instant messaging application will be displayed on the left screen, and the application interface of the video player application should be displayed on the right screen. And at this moment the double-screen mobile terminal will detect the handheld state.

Figure 8:
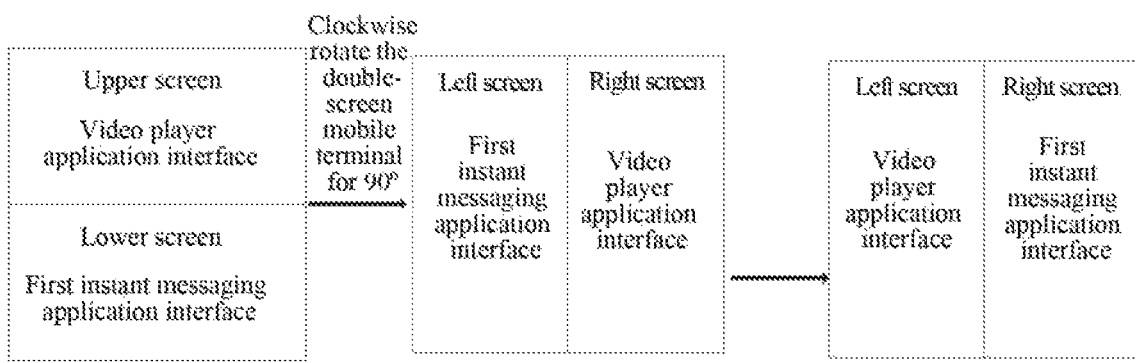
FIG. 8 illustrates another schematic diagram of displaying an application interface when a double-screen mobile terminal is rotated to be in a portrait display state according to an embodiment of the present disclosure.

The double-screen mobile terminal may detect pressed positions on a back side and judge whether the detected pressed positions are distributed on the same screen. If the detected pressed positions are all distributed on the right screen, it indicates that the current handheld state is the single-hand handheld state and is a right-hand handheld state, i.e., at this moment the user is holding the right screen with a right hand. At this moment, the double-screen mobile terminal will compare the operation frequency level of the first instant messaging application with the operation frequency level of the video player application. The double-screen mobile terminal judges that the operation frequency level of the first instant messaging application is higher than the operation frequency level of the video player application, thus the double-screen mobile terminal will switch the application interface of the first instant messaging application to be displayed on the screen corresponding to the current handheld state, i.e., switch the application interface of the first instant messaging application to be displayed on the right screen, and switch the application interface of the video player application to be displayed on the left screen. As illustrated in FIG. 8, it illustrates another schematic diagram of displaying an application interface when a double-screen mobile terminal is rotated to be in a portrait display state.

If the detected pressed positions are all distributed on the left screen, it indicates that the current handheld state is the single-hand handheld state and is a left-hand handheld state, i.e., at this moment the user is holding the left screen with a left hand. Since at this moment the application interface of the first instant messaging application with the higher operation frequency level is displayed on the left screen, the double-screen mobile terminal does not need to switch the application interface any longer.

If the detected pressed positions are distributed on two screens, it indicates that the current handheld state is the double-hand handheld state. And the double-screen mobile terminal will further judge which hand of the user is holdings the double-screen mobile terminal. If it is judged that the left hand of the user is holdings the double-screen mobile terminal, it indicates that at this moment the user needs to operate an application with a right hand, thus the double-screen mobile terminal will switch the application interface of the first instant messaging application to be displayed on the right screen, and switch the application interface of the video player application to be displayed on the left screen. The purpose of that is to consider that the user needs to operate the application with the right hand and thus the application interface of the application is displayed on the right screen to facilitate the user to perform the operation. If it is judged that the right hand of the user is holdings the double-screen mobile terminal, it indicates that at this moment the user needs to operate the application with the left hand. Since at this moment the application interface of the first instant messaging application with the higher operation frequency level is displayed on the left screen, the double-screen mobile terminal does not need to switch the application interface.

In addition, when the double-screen mobile terminal is in a portrait display state, if only one application is opened, when the handheld state is changed, the application interface of the opened application will be switched to be displayed on the corresponding screen with the change of the handheld state. For example, if at this moment the user opens a browser application, and the application interface of the browser application is displayed on the right screen, and the user is performing an operation with a single hand, i.e., operating the application with the right hand. If at this moment the user wants to perform an operation with the left hand, the user will use the left hand to hold the double-screen mobile terminal to perform the operation. The double-screen mobile terminal will detect pressed positions on a back side. The double-screen mobile terminal detects that the pressed positions are all distributed on the left screen, it indicates that the current handheld state has already been updated from the right hand handheld state to the left hand handheld state, i.e., at this moment the user is holding the left screen with the left hand, thus the double-screen mobile terminal will switch the application interface of the browser application to be displayed on the screen corresponding to the current handheld state, i.e., switch the application interface of the browser application to be displayed on the left screen.

In step S303, whether the handheld state corresponds to the target screen is judged.

In the step S303, after the double-screen mobile terminal detects the handheld state, the double-screen mobile terminal will judge whether the handheld state corresponds to the target screen, i.e., judge whether the handheld state corresponds to the screen on which the application interface is displayed.

In step S304, if the handheld state does not correspond to the target screen, the target application interface is switched to be displayed on the other screen of the double-screen mobile terminal.

In the step S304, if the double-screen mobile terminal judges that the handheld state does not correspond to the target screen, i.e., the handheld state does not correspond to the screen on which the application interface is displayed, the double-screen mobile terminal will switch the application interface to be displayed on the screen corresponding to the handheld state.

This embodiment provides a screen content switching method applied to a double-screen mobile terminal. When a screen on which an application interface is displayed does not correspond to a handheld state, the double-screen mobile terminal can automatically switch the application interface to be displayed on a screen corresponding to the handheld state, and thereby it is more convenient to operate an application.

Figure 9:
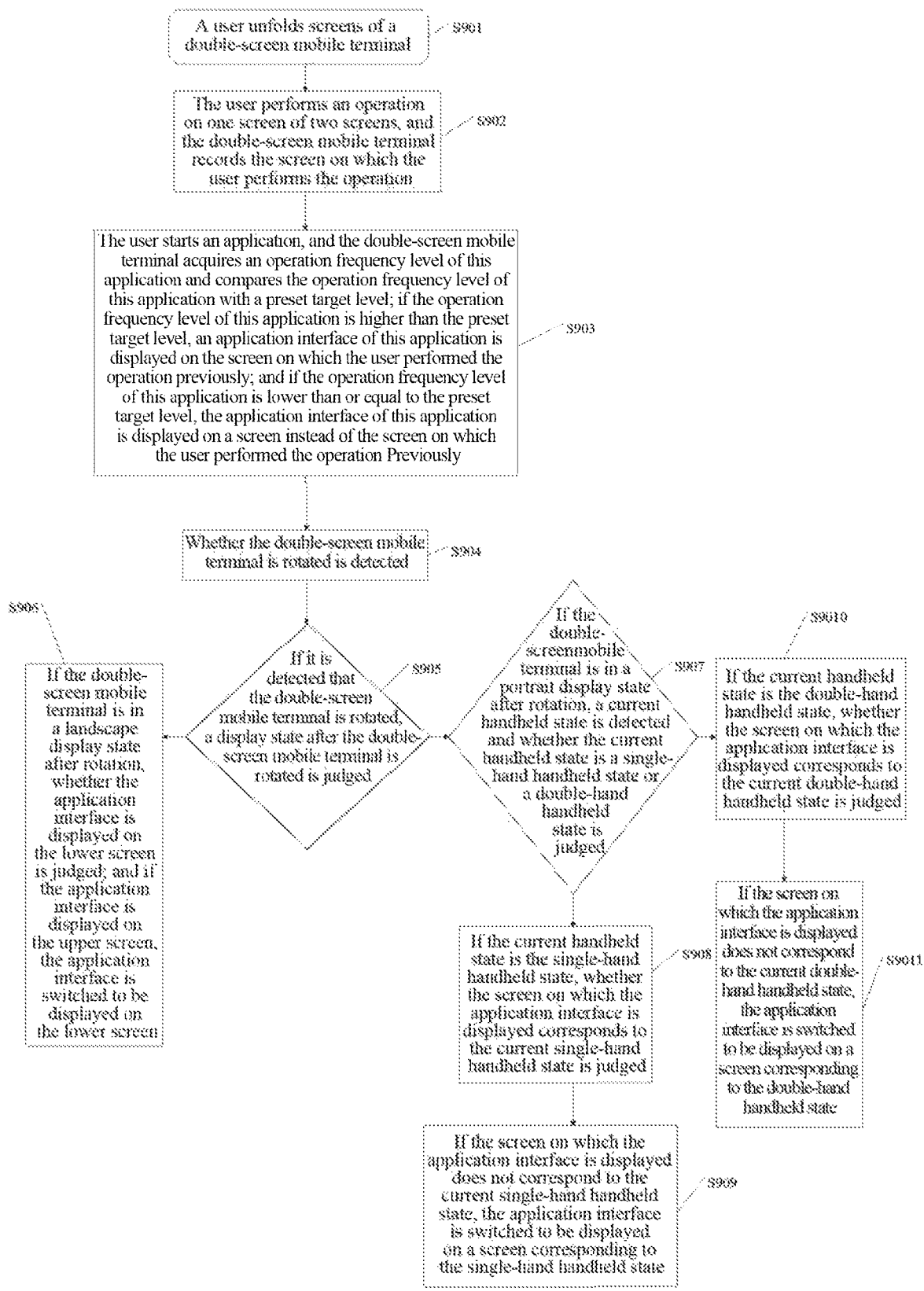
FIG. 9 illustrates a flowchart of another screen content switching method according to an embodiment of the present disclosure.

As illustrated in FIG. 9, an embodiment of the present disclosure provides another screen content switching method applied to a double-screen mobile terminal, including the following steps S901-S9011.

In step S901, a user unfolds screens of a double-screen mobile terminal.

In step S902, the user performs an operation on one screen of two screens, and the double-screen mobile terminal records the screen on which the user performs the operation.

In step S903, the user starts an application and the double-screen mobile terminal acquires an operation frequency level of this application and compares the operation frequency level of this application with a preset target level. If the operation frequency level of this application is higher than the preset target level, an application interface of this application is displayed on a screen on which the user performed the operation previously. If the operation frequency level of this application is lower than or equal to the preset target level, the application interface of this application is displayed on a screen instead of the screen on which the user performed the operation previously.

In step S904, whether the double-screen mobile terminal is rotated is detected.

In step S905, if it is detected that the double-screen mobile terminal is rotated, a display state after the double-screen mobile terminal is rotated is judged.

In step S906, if the double-screen mobile terminal is in a landscape display state after rotation, whether the application interface is displayed on the lower screen is judged; and if the application interface is displayed on the upper screen, the application interface is switched to be displayed on the lower screen.

In step S907, if the double-screen mobile terminal is in a portrait display state after rotation, a current handheld state is detected, and whether the current handheld state is a single-hand handheld state or a double-hand handheld state is judged.

In step S908, if the current handheld state is the single-hand handheld state, whether the screen on which the application interface is displayed corresponds to the current single-hand handheld state is judged.

In step S909, if the screen on which the application interface is displayed does not correspond to the current single-hand handheld state, the application interface is switched to be displayed on the screen corresponding to the single-hand handheld state.

In step S9010, if the current handheld state is the double-hand handheld state, whether the screen on which the application interface is displayed corresponds to the current double-hand handheld state is judged.

In step S9011, if the screen on which the application interface is displayed does not correspond to the current double-hand handheld state, the application interface is switched to be displayed on the screen corresponding to the double-hand handheld state.

This embodiment provides a screen content switching method applied to a double-screen mobile terminal. When a screen on which an application interface is displayed does not correspond to a handheld state, the double-screen mobile terminal can automatically switch the application interface to be displayed on a screen corresponding to the handheld state, and thereby it is more convenient to operate an application.

Figure 10:
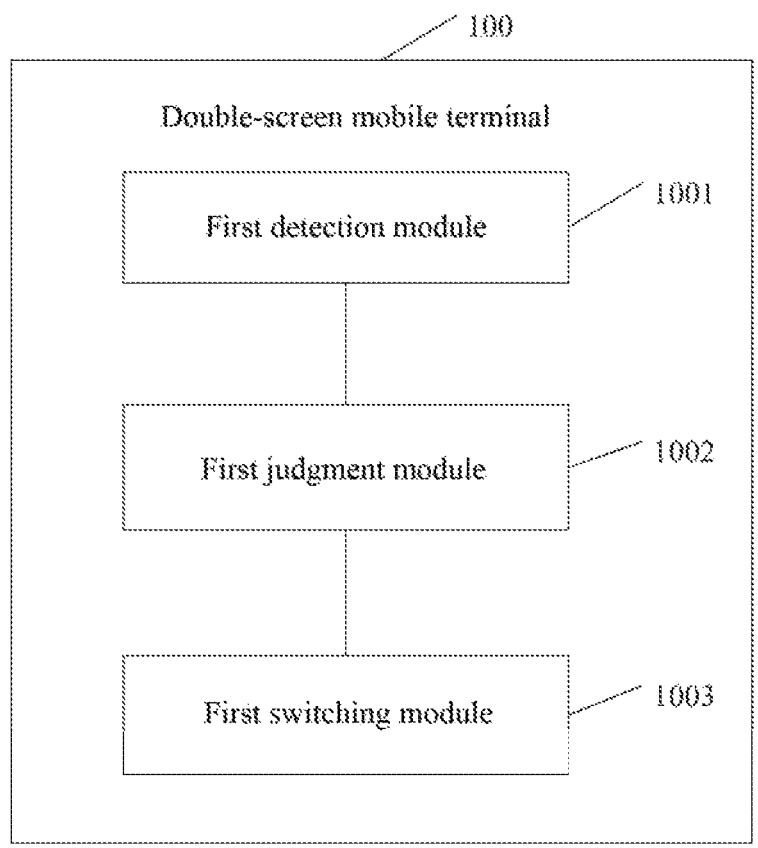
FIG. 10 illustrates a structural diagram of a double-screen mobile terminal according to an embodiment of the present disclosure.

As illustrated in FIG. 10, an embodiment of the present disclosure provides a double-screen mobile terminal 100, including the following modules a first detection module 1001, a first judgment module 1002 and a first switching module 1003.

The first detection module 1001 is configured to detect a handheld state of the double-screen mobile terminal when a target application interface is displayed on a target screen; herein the target screen is one screen of the double-screen mobile terminal.

The first judgment module 1002 is configured to judge whether the handheld state corresponds to the target screen.

The first switching module 1003 is configured to, if the handheld state does not correspond to the target screen, switch the target application interface to be displayed on the other screen of the double-screen mobile terminal.

Figure 11:
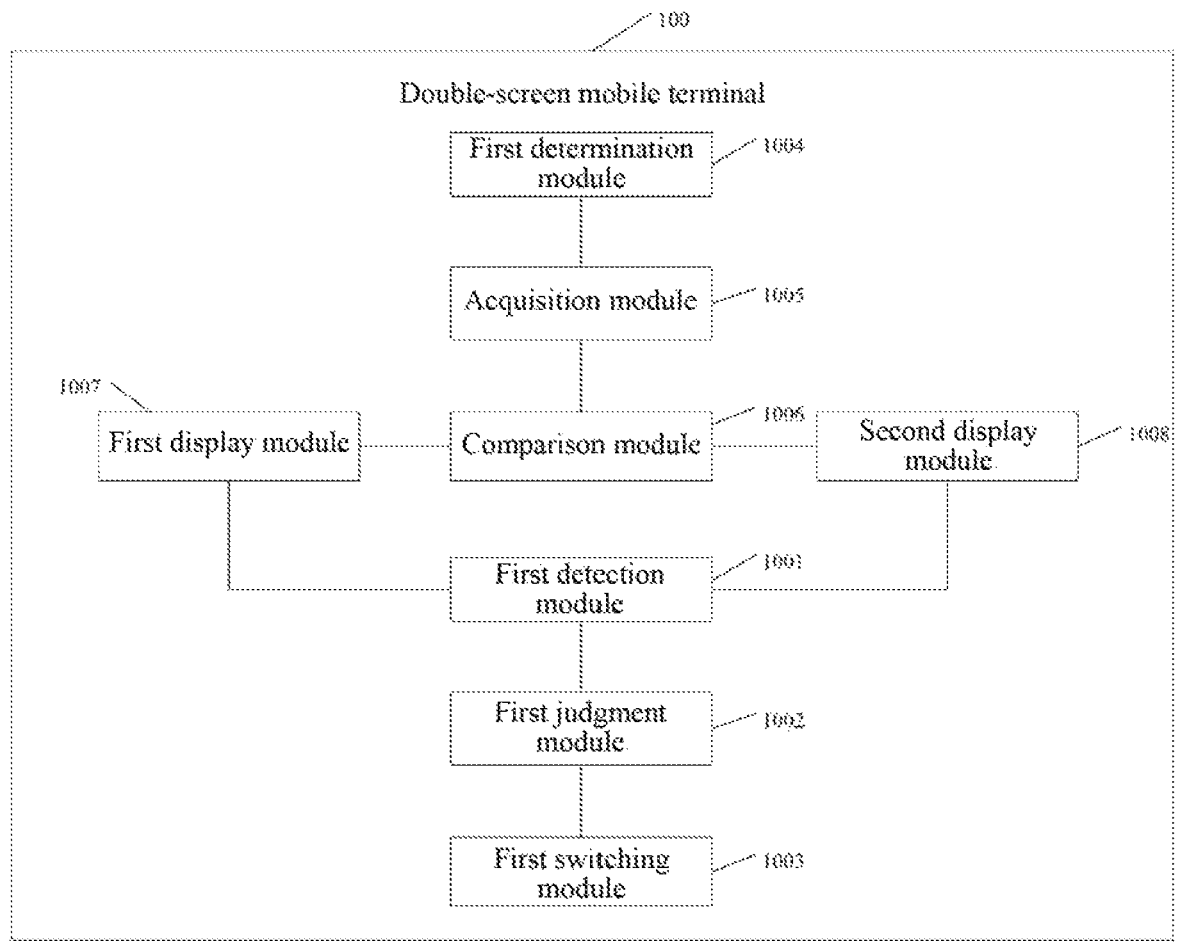
FIG. 11 illustrates a structural diagram of another double-screen mobile terminal according to an embodiment of the present disclosure.

In one exemplary implementation mode, as illustrated in FIG. 11, the double-screen mobile terminal 100 may further include a first determination module 1004, an acquisition module 1005, a comparison module 1006, a first display module 1007 and a second display module 1008.

The first determination module 1004 is configured to receive a target operation input by a user and determine a screen which receives the target operation.

The acquisition module 1005 is configured to acquire a preset operation frequency level of a target application if the target application interface of the target application needs to be displayed.

The comparison module 1006 is configured to compare the preset operation frequency level with a preset target level.

The first display module 1007 is configured to, if the preset operation frequency level is higher than the preset target level, display the target application interface on the screen which receives the target operation.

The second display module 1008 is configured to, if the preset operation frequency level is lower than or equal to the preset target level, display the target application interface on the other screen of the double-screen mobile terminal.

Figure 12:
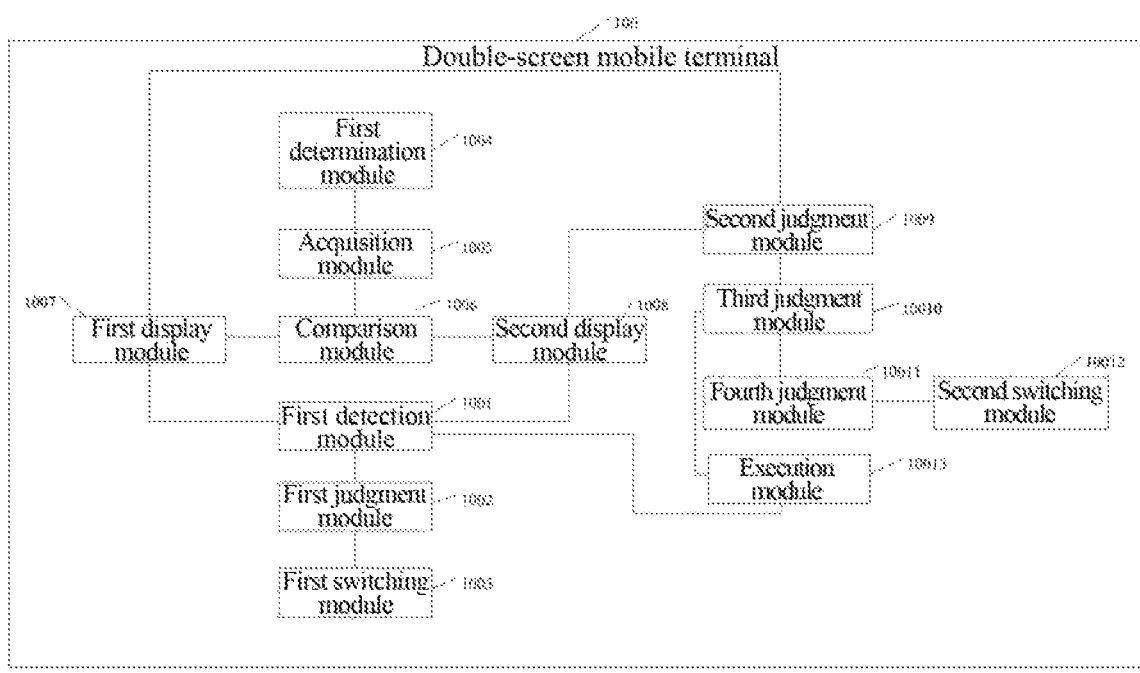
FIG. 12 illustrates a structural diagram of another double-screen mobile terminal according to an embodiment of the present disclosure.

In one exemplary implementation mode, as illustrated in FIG. 12, the double-screen mobile terminal 100 may further include a second judgment module 1009, a third judgment module 10010, a fourth judgment module 10011, a second switching module 10012 and an execution module 10013.

The second judgment module 1009 is configured to judge whether the double-screen mobile terminal is rotated.

The third judgment module 10010 is configured to, if it is judged that the double-screen mobile terminal is rotated, judge a display state after the double-screen mobile terminal is rotated.

The fourth judgment module 10011 is configured to, if the display state is a landscape display state after the double-screen mobile terminal is rotated, judge a type of the screen on which the target application interface is displayed.

The second switching module 10012 is configured to, if the screen on which the target application interface is displayed is a first screen, switch the target application interface to be displayed on a second screen.

The execution module 10013 is configured to, if the display state is a portrait display state after the double-screen mobile terminal is rotated, execute the step of detecting the handheld state of the double-screen mobile terminal.

Figure 13:
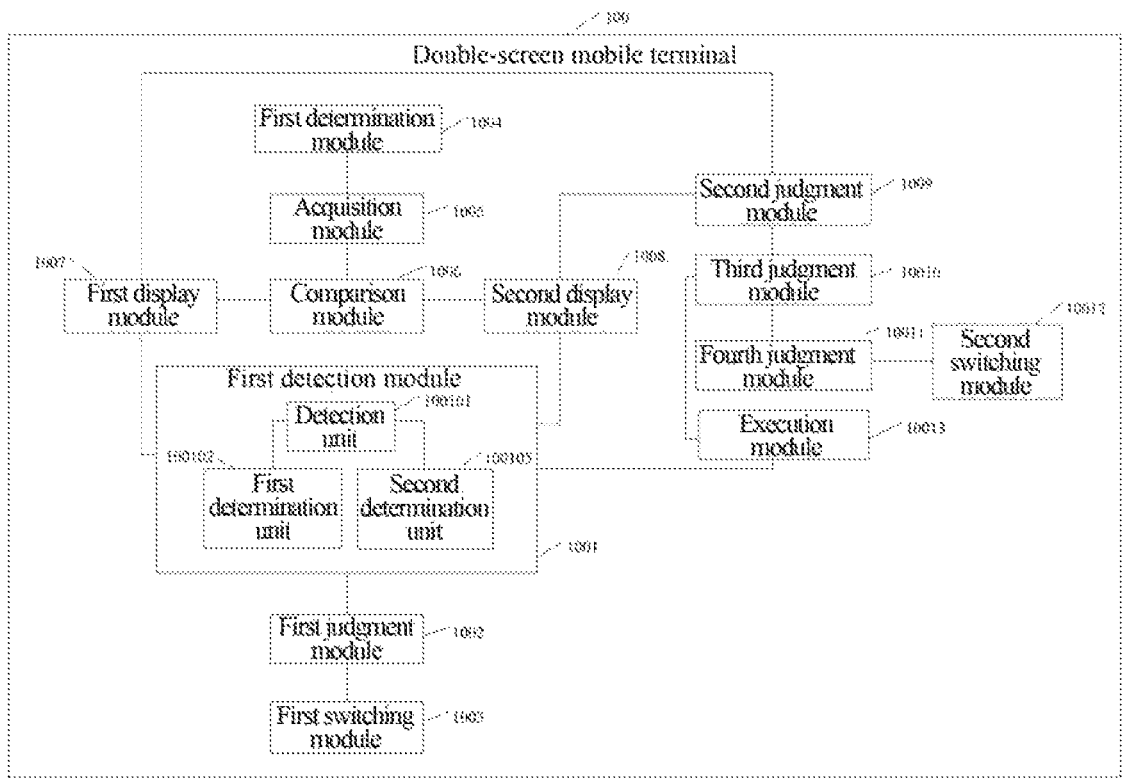
FIG. 13 illustrates a structural diagram of another double-screen mobile terminal according to an embodiment of the present disclosure.

In one exemplary implementation mode, as illustrated in FIG. 13, the first detection module 1001 may include a detection unit 100101, a first determination unit 100102 and a second determination unit 100105.

The detection unit 100101 is configured to detect pressed positions on a back side of the double-screen mobile terminal.

The first determination unit 100102 is configured to, if the pressed positions are distributed on the same screen, determine that the handheld state is a single-hand handheld state.

The second determination unit 100105 configured to, if the pressed positions are distributed on two screens, determine that the handheld state is a double-hand handheld state.

The first judgment module 1002 may be configured to, if the handheld state is the single-hand handheld state, judge whether the screen on which the target application interface is displayed corresponds to the single-hand handheld state.

The first switching module 1003 may be configured to, if the screen on which the target application interface is displayed does not correspond to the single-hand handheld state, switch the target application interface to be displayed on a screen corresponding to the single-hand handheld state.

The first judgment module 1002 may be further configured to, if the handheld state is the double-hand handheld state, judge whether the screen on which the target application interface is displayed corresponds to the double-hand handheld state.

The first switching module 1003 may be further configured to, if the screen on which the target application interface is displayed does not correspond to the double-hand handheld state, switch the target application interface to be displayed on the screen corresponding to the double-hand handheld state.

In one exemplary implementation mode, the preset operation frequency level may be a preset operation frequency level obtained through presetting; or the preset operation frequency level may be a preset operation frequency level determined by the double-screen mobile terminal according to start times of the target application.

In this embodiment, the above-mentioned double-screen mobile terminal may be the double-screen mobile terminal as illustrated in FIG. 1, FIG. 3 and FIG. 9, and any implementation mode of the double-screen mobile terminal in the embodiments illustrated in FIG. 1, FIG. 3 and FIG. 9 may be implemented by the double-screen mobile terminal in this embodiment and thus is not repetitively described here.

This embodiment provides a double-screen mobile terminal. This double-screen mobile terminal includes double screens, and the screen content switching method may be implemented on this double-screen mobile terminal. When a screen on which an application interface is displayed does not correspond to a handheld state, the double-screen mobile terminal can automatically switch the application interface to be displayed on a screen corresponding to the handheld state, and thereby it is more convenient to operate an application.

One ordinary skilled in the art can understand that all or partial steps of the methods in the above-mentioned embodiments may be completed through relevant hardware instructed by a program. The program may be stored on a machine-readable medium, and when the program is executed, the following steps are included.

A handheld state of the double-screen mobile terminal is detected when a target application interface is displayed on a target screen, herein the target screen is one screen of the double-screen mobile terminal.

Whether the handheld state corresponds to the target screen is judged.

If the handheld state does not correspond to the target screen, the target application interface is switched to be displayed on the other screen of the double-screen mobile terminal.

In one exemplary implementation mode, when the program is executed, the following steps may be further included. Before the step of detecting a handheld state of the double-screen mobile terminal when a target application interface is displayed on a target screen, a target operation input by a user is received and a screen which receives the target operation is determined.

A preset operation frequency level of a target application is acquired if the target application interface of the target application needs to be displayed.

The preset operation frequency level is compared with a preset target level.

If the preset operation frequency level is higher than the preset target level, the target application interface is displayed on the screen which receives the target operation.

If the preset operation frequency level is not higher than the preset target level, the target application interface is displayed on the other screen of the double-screen mobile terminal.

In one exemplary implementation mode, when the program is executed, the following steps may be further included. Before the step of detecting a handheld state of the double-screen mobile terminal, whether the double-screen mobile terminal is rotated is judged.

If it is judged that the double-screen mobile terminal is rotated, a display state after the double-screen mobile terminal is rotated is judged.

If the display state is a landscape display state after the double-screen mobile terminal is rotated, a type of the screen on which the target application interface is displayed is judged.

If the screen on which the target application interface is displayed is a first screen, the target application interface is switched to be displayed on a second screen.

If the display state is a portrait display state after the double-screen mobile terminal is rotated, the step of detecting the handheld state of the double-screen mobile terminal is executed.

In one exemplary implementation mode, the step of detecting the handheld state of the double-screen mobile terminal may include that:

pressed positions on a back side of the double-screen mobile terminal are detected;

if the pressed positions are distributed on the same screen, it is determined that the handheld state is a single-hand handheld state; and if the pressed positions are distributed on two screens, it is determined that the handheld state is a double-hand handheld state.

The step of judging whether the handheld state corresponds to the target screen, and if the handheld state does not correspond to the target screen, switching the target application interface to be displayed on the other screen of the double-screen mobile terminal may include the following operations.

If the handheld state is the single-hand handheld state, whether the screen on which the target application interface is displayed corresponds to the single-hand handheld state is judged.

If the screen on which the target application interface is displayed does not correspond to the single-hand handheld state, the target application interface is switched to be displayed on a screen corresponding to the single-hand handheld state.

If the handheld state is the double-hand handheld state, whether the screen on which the target application interface is displayed corresponds to the double-hand handheld state is judged.

If the screen on which the target application interface is displayed does not correspond to the double-hand handheld state, the target application interface is switched to be displayed on a screen corresponding to the double-hand handheld state.

In one exemplary implementation mode, the preset operation frequency level may be a preset operation frequency level obtained through presetting;

or, the preset operation frequency level may be a preset operation frequency level determined by the double-screen mobile terminal according to start times of the target application.

The machine-readable medium may include a Read-Only Memory (ROM), a Random Access Memory (RAM), a magnetic disc, a compact disc or the like.

One ordinary skilled in the art can understand that all or some steps in the methods disclosed above in the document and function modules/units in the systems and apparatuses may be implemented as software, firmware, hardware and proper combinations thereof. In the hardware implementation mode, division of function modules/units mentioned in the above-mentioned description does not certainly correspond to division of physical components. For example, one physical component may have multiple functions or one function or step may be executed cooperatively by multiple physical components. Some components or all components may be implemented as software executed by a processor, such as a digital signal processor or a microprocessor, or may be implemented as hardware, or may be implemented as integrated circuits, such as specific integrated circuits. Such software may be distributed on a machine-readable medium (such as a computer-readable medium), the computer-readable medium may include computer storage mediums (or non-transient mediums) and communication mediums (or transient mediums). As well-known by one ordinary skilled in the art, the term "computer storage medium" includes volatile, nonvolatile, removable and irremovable mediums implemented in any method or technique for storing information (such as computer-readable instructions, data structures, program modules or other data). The computer storage medium includes but is not limited to RAMs, ROMs, EEPROMs, flash memories or other memory technologies, CD-ROMs, Digital Versatile Discs (DVDs) or other compact disc memories, magnetic cassettes, magnetic tapes, magnetic disc memories or other magnetic storage devices, or any other mediums which may be used for storing expected information and may be accessed by computers. Besides, as well-known by one ordinary skilled in the art, the communication mediums usually include computer-readable instructions, data structures, program modules or other data in modulated data signals, such as of carriers or other transmission mechanisms, and may include any information delivery mediums.

What are described above are exemplary implementation modes of the present disclosure. It needs to be pointed out that one ordinary skilled in the art may make various improvements and modifications without departing from the principle of the present disclosure. And these improvements and modifications shall be also considered to fall in the protection scope of the present disclosure.

INDUSTRIAL APPLICABILITY

The embodiments of the present disclosure provide a screen content switching method and a double-screen mobile terminal. When a screen on which an application interface is displayed does not correspond to a handheld state, the double-screen mobile terminal can automatically switch the application interface to be displayed on a screen corresponding to the handheld state, and thereby it is more convenient to operate an application.

What I claim is:

1. A screen content switching method, applied to a double-screen mobile terminal, comprising:
   detecting a handheld state of the double-screen mobile terminal when a target application interface is displayed on a target screen, wherein the target screen is one screen of the double-screen mobile terminal;
   judging whether the handheld state corresponds to the target screen; and if the handheld state does not correspond to the target screen, switching the target application interface to be displayed on other screen of the double-screen mobile terminal;
   wherein, before the step of detecting a handheld state of the double-screen mobile terminal when a target application interface is displayed on a target screen, the method further comprises:
   receiving a target operation input by a user and determining a screen which receives the target operation;
   acquiring an operation frequency level of a target application if the target application interface of the target application needs to be displayed;
   comparing the operation frequency level with a preset target level; if the operation frequency level is higher than the preset target level, displaying the target application interface on the screen which receives the target operation; and if the operation frequency level is lower than or equal to the preset target level, displaying the target application interface on other screen of the double-screen mobile terminal;

wherein the operation frequency level of the target application is obtained through presetting or determined by the double-screen mobile terminal according to start times of the target application, and wherein, before the step of detecting a handheld state of the double-screen mobile terminal, the method further comprises:

judging that the double-screen mobile terminal is being rotated, judging a display state after the double-screen mobile terminal is rotated:

if the display state is a landscape display state after the double-screen mobile terminal is rotated, judging a type of a screen on which the target application interface is displayed, and if the screen on which the target application interface is displayed is a first screen, switching the target application interface to be displayed on a second screen: and if the display state is a portrait display state after the double-screen mobile terminal is rotated, executing the step of detecting the handheld state of the double-screen mobile terminal;

wherein the step of detecting the handheld state of the double-screen mobile terminal comprises:

detecting pressed positions on a back side of the double-screen mobile terminal; if the pressed positions are distributed on a same screen, determining that the handheld state is a single-hand handheld state;

if the pressed positions are distributed on two screens, determining that the handheld state is a double-hand handheld state; and the judging whether the handheld state corresponds to the target screen, and if the handheld state does not correspond to the target screen, switching the target application interface to be displayed on other screen of the double-screen mobile terminal comprises:

if the handheld state is the single-hand handheld state, judging whether the screen on which the target application interface is displayed corresponds to the single-hand handheld state;

if the screen on which the target application interface is displayed does not correspond to the single-hand handheld state, switching the target application interface to be displayed on a screen corresponding to the single-hand handheld state;

if the handheld state is the double-hand handheld state, judging whether the screen on which the target application interface is displayed corresponds to the double-hand handheld state; and if the screen on which the target application interface is displayed does not correspond to the double-hand handheld state, switching the target application interface to be displayed on a screen corresponding to the double-hand handheld state.

2. A non-transitory machine-readable medium, storing a computer-executable program, which, when executed by a processor, implements the screen content switching method according to claim 1.

\* \* \* \* \*